Dec. 27, 1966
R. H. SMITH
3,293,849
VEHICLE BRAKING SYSTEM
Filed Oct. 11, 1963
4 Sheets-Sheet 1
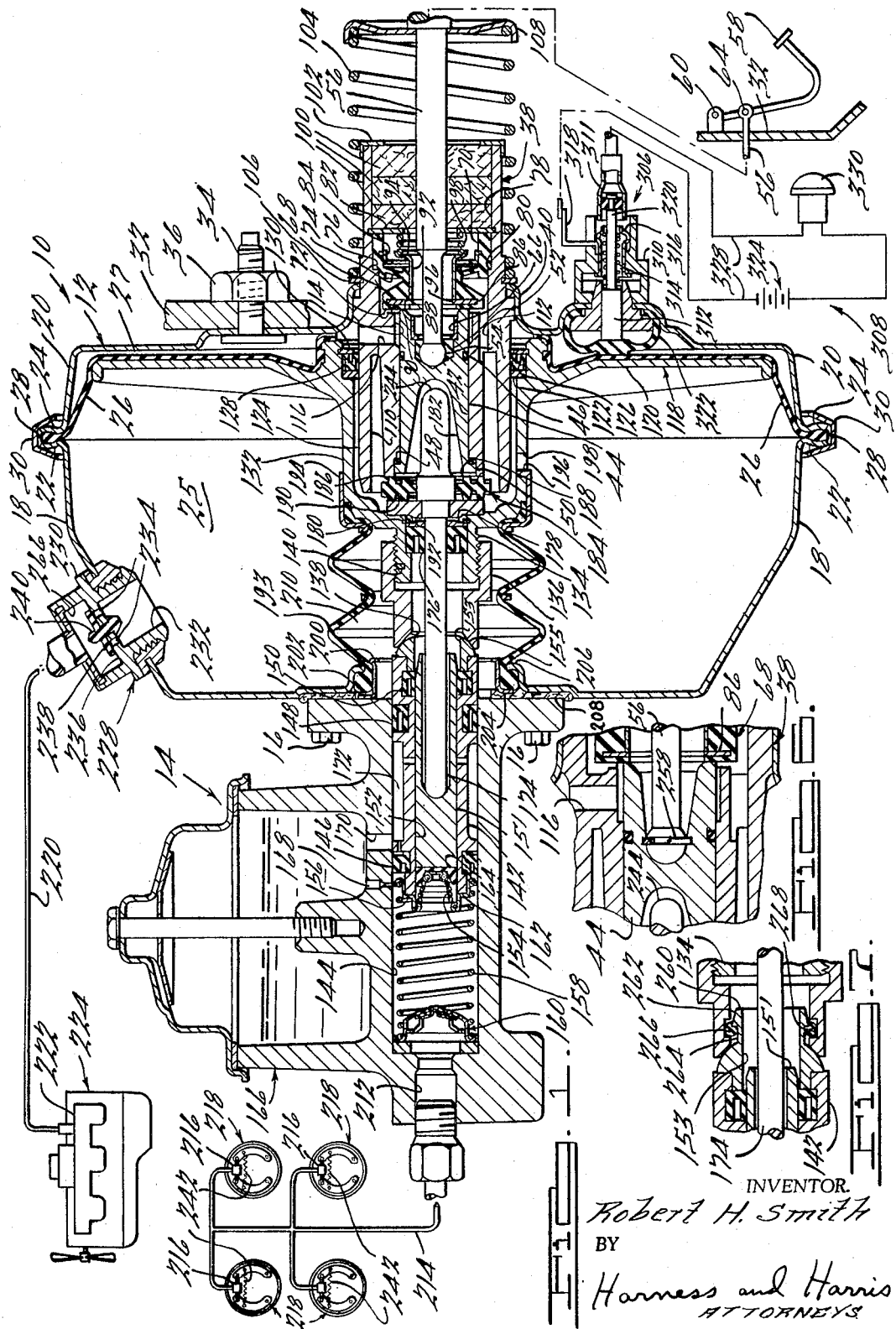
INVENTOR.
Robert H. Smith
BY
Harness and Harris
ATTORNEYS

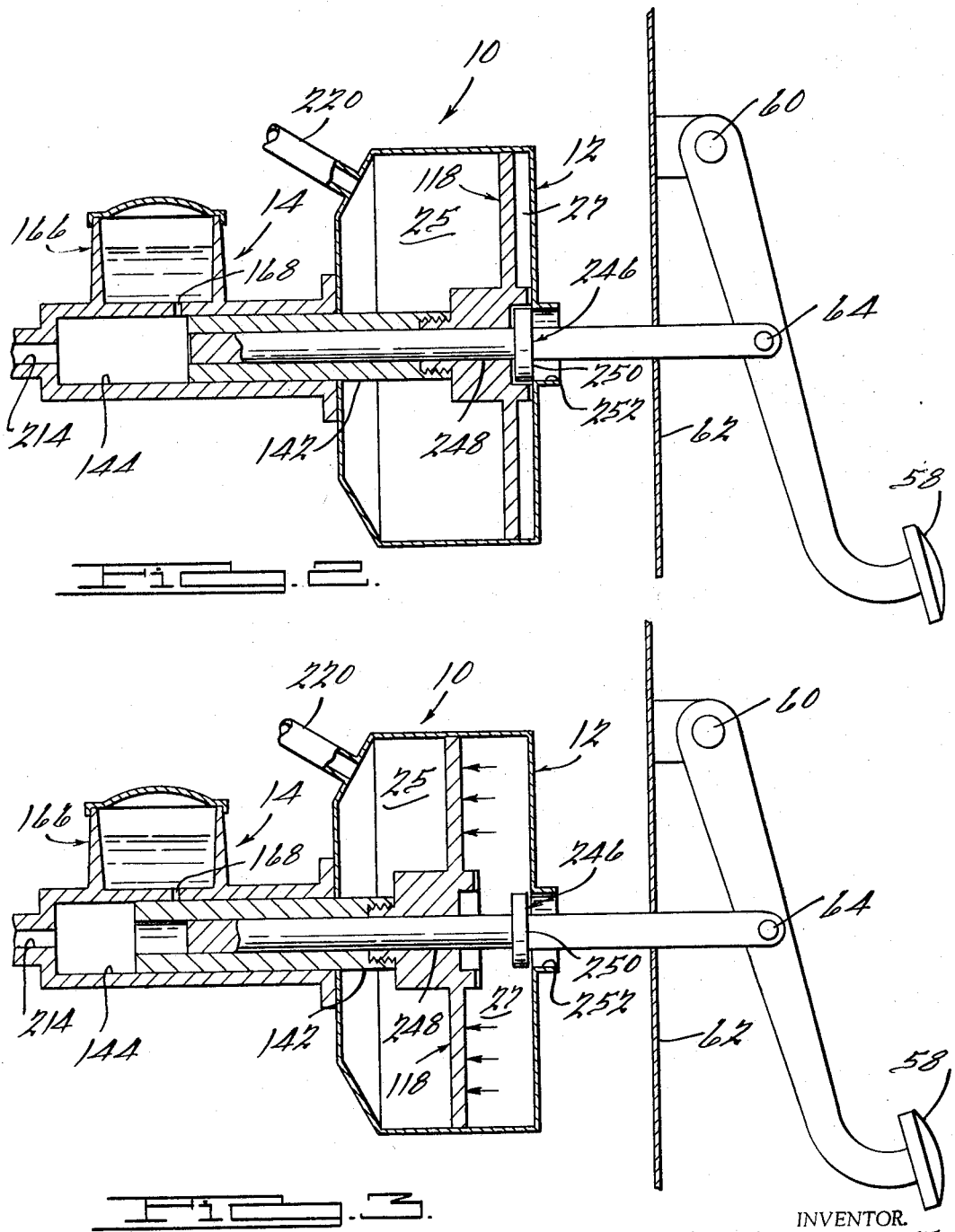

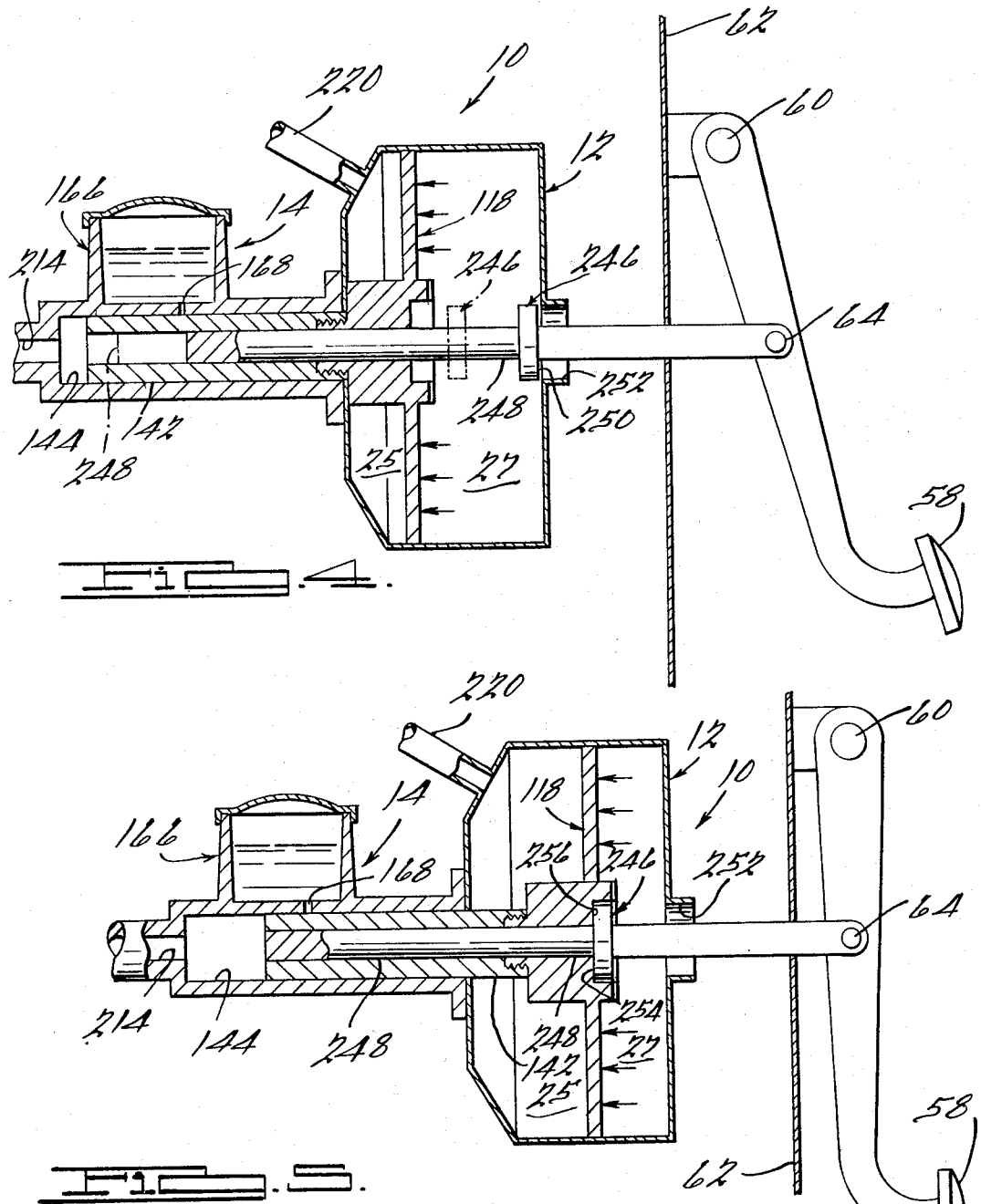

Dec. 27, 1966  R. H. SMITH  3,293,849
VEHICLE BRAKING SYSTEM
Filed Oct. 11, 1963  4 Sheets-Sheet 4
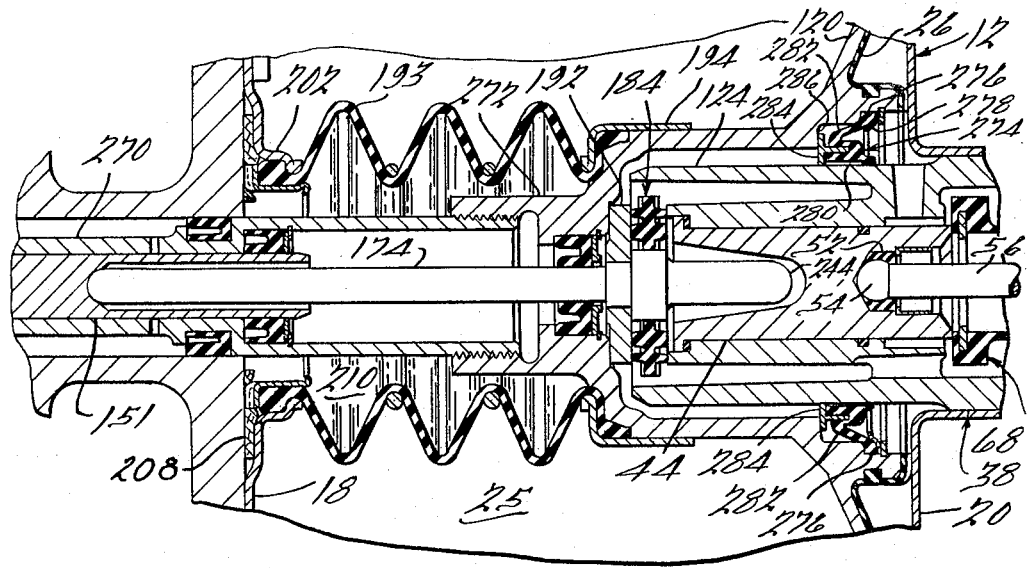
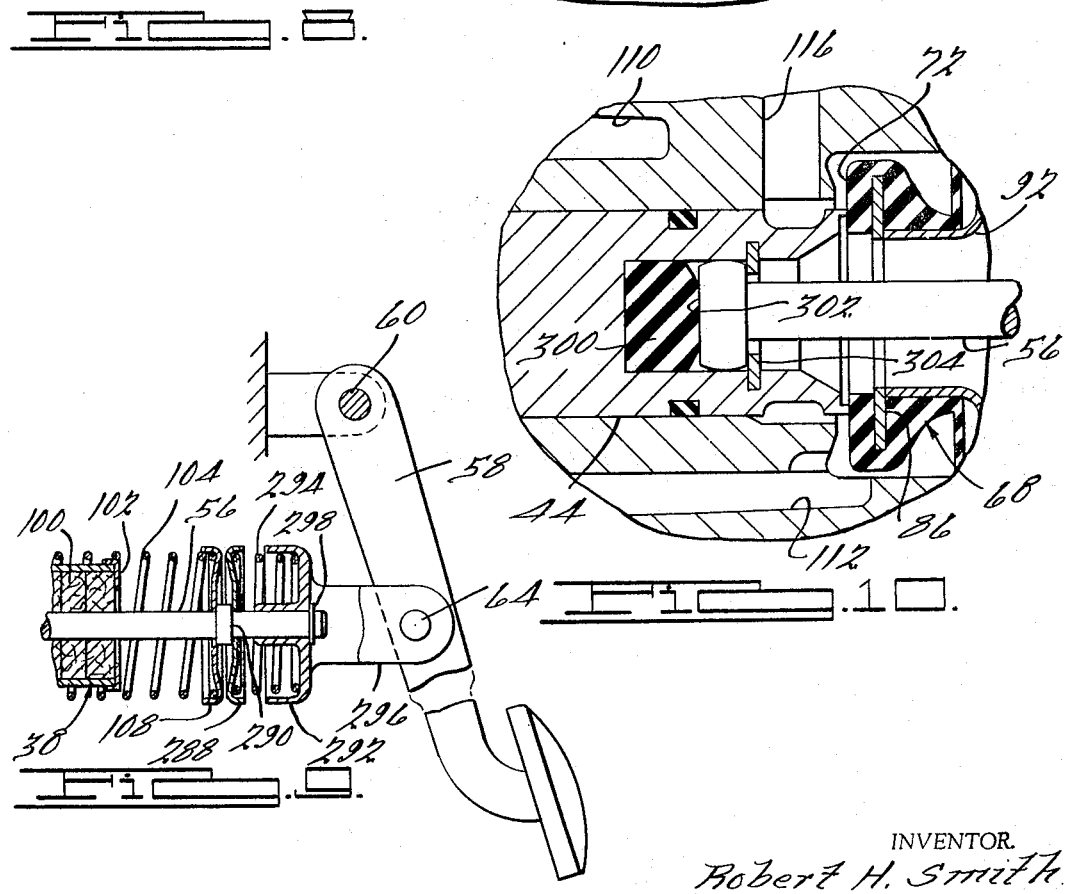
INVENTOR.
Robert H. Smith
BY
Harness and Harris
ATTORNEYS

3,293,849
VEHICLE BRAKING SYSTEM
Robert H. Smith, Royal Oak, Mich., assignor to Chrysler Corporation, Highland Park, Mich., a corporation of Delaware
Filed Oct. 11, 1963, Ser. No. 315,640
10 Claims. (Cl. 60—54.5)

This invention relates generally to a vehicle braking system and more particularly to a power brake unit employed within such a system.

The various differential fluid pressure operated power brake units proposed in the past can be broadly classified into two general categories the first of which includes those power brake units which supplement the vehicle operator's physically applied braking force throughout the entire range of vehicle braking. That is, with such power brake units the operator continually contributes a small percentage of the total work required by the braking system in achieving the desired vehicle braking.

The second category includes those power brake units wherein the force exerted by the vehicle operator does not contribute to the work of the brake system. Such are often referred to as full power brake units as contrasted to those of the first category which are often referred to as power assist brake units.

Although power brake units of both categories have been employed in vehicle braking systems they, nevertheless, each have exhibited characteristics which in at least some instances are considered to be highly undesirable.

For example, in various earlier power brake units the operator did not experience a pedal "feel" proportional to the applied vehicle braking force. Accordingly, since such power brake units did not inherently provide a proper pedal feel, various devices and arrangements were added to the basic power brake unit for the express purpose of creating a sensory signal, through the brake pedal to the operator, indicative of the applied vehicle braking force. Such arrangements, generally, did not in any way contribute to the operability or effectiveness of the power brake unit per se.

The problem of creating some proportional brake pedal feel was often amplified in braking systems employing full power brake units since in such instances the operator did not contribute to the total work required for vehicle braking.

In addition to the above, other problems exist with power brake units of the prior art. For example, due to increases in vehicle weight and speeds higher braking forces have been required. Even though this can be theoretically achieved by increasing the diameter of the power brake power piston, it is, as a practical matter, a usually unattainable solution because of space limitations in the conventional automotive vehicle. Attempts at circumventing this problem have been made. One solution, even though relatively costly, has been to employ dual power pistons, each of which is subjected to a pressure differential so as to act in unison, thereby providing an increase in hydraulic braking forces while not increasing the overall diameter of the power piston. Even though such dual power piston braking units are employed in braking systems, they are not considered to be a totally acceptable solution since the addition of a second power piston not only substantially increases the cost but also increases the number of required pressure seals each of which presents a possible source of failure.

Another serious disadvantage of the prior art power brake units is that the vehicle operator has no indication by which he can either anticipate a failure of the braking system or detect a need for repair.

For example, after some extended period it might be necessary to either adjust the brake shoes or replace the brake linings. However, with power brake units of the prior art, the ability to detect such a need is virtually made impossible since the vehicle operator never experiences any real perceptible change in brake pedal position during normal driving conditions. This, of course, is a result of the power piston continually moving a greater extent thereby at least superficially compensating for brake lining wear. The power piston would also compensate, in the same manner, if a slight leak occurred in the hydraulic circuitry. Consequently, this inability of prior systems to detect the need for repair and warn the operator creates a serious safety problem. That is, as previously stated, the power piston attempts to compensate by increasing its own length of stroke. This, however, is limited by the physical dimensions of the power cylinder. That is, when the brake lining has worn sufficiently or if a sufficient quantity of operating fluid has escaped due to a leak in the hydraulic system, the power piston cannot increase its stroke beyond that point at which it effectively abuts against or its travel is in some other way limited by the power piston housing.

Therefore, in prior art systems, if the power piston reaches its maximum travel before it can develop sufficient braking forces the vehicle can not be brought to a safe stop. Of course, as is evident from the above, there is no way in which the vehicle operator can anticipate the occurrence of such an event.

Various auxiliary devices have been proposed by which the vehicle operator could be informed of the pending occurrence of brake failure. However, such proposed devices, aside from the fact that they were in and of themselves susceptible to failure, have not been totally effective. For example, one such proposal comprised an electrical switching means, actuated by the power piston when it reached a point near the end of its maximum travel, for closing an electrical circuit leading to a lamp located on the vehicle dash panel.

This arrangement had many failings. The vehicle operator if uninformed as to the significance of the warning light might well ignore it. Also if the operator is aware of the significance of the energized warning light, he may still defer repair believing that since he is experiencing no present difficulty in braking, the brake system is still not really in any urgent need for repair. Further, if the vehicle is being driven relatively slowly with only gradual braking, the power piston may never travel to the point which would cause the warning light to be energized until possibly the occurrence of some subsequent high speed panic braking requirement at which time the power piston may undergo maximum travel and yet provide insufficient braking forces.

Accordingly, an object of this invention is to provide a novel and improved power brake unit which inherently provides the vehicle operator with a brake pedal feel which is indicative of the applied vehicle braking force.

Another object of this invention is to provide a novel and improved power brake unit which inherently creates an indication by which the vehicle operator can either anticipate or detect a failing in the vehicle braking system.

A further object of this invention is to provide a novel and improved power brake unit which can exert substantially increased braking forces as compared to prior art power brake units without the necessity of employing dual power pistons and without the necessity of increasing either the diameter of the power piston or the braking pressure differential thereacross as presently employed in the power brake units of the prior art.

Other more specific objects and advantages of the invention will become apparent when reference is made to the following description and accompanying drawings wherein:

FIGURE 1 is a longitudinal cross-sectional view of a power brake unit constructed in accordance with the teachings of this invention shown in combination with other portions of a schematically illustrated vehicle braking system;

FIGURES 2, 3, 4 and 5 are schematic illustrations of the power brake unit of FIGURE 1 in various operating positions; and FIGURES 6 through 10 are fragmentary cross-sectional views each illustrating a modification of the invention.

Referring now in greater detail to the drawings, FIGURE 1 illustrates a power brake unit 10 comprised of a fluid pressure servo motor 12 and a master cylinder assembly 14 suitably secured thereto as by screws 16.

The servo motor housing is formed by cup-like housing sections 18 and 20 provided with the generally radially directed flanges 22 and 24, respectively. A flexible diaphragm 26, secured to the housing by means of a peripheral bead 28 being retained between flanges 22 and 24, defines at opposite sides thereof variable but distinct fluid pressure chambers 25 and 27. An annular retainer member 30, located generally circumferentially about the servo motor housing, serves to secure housing sections 18 and 20 by means of urging the respective flanges 22 and 24 against bead 28 and towards each other. The entire power brake unit 10, including master cylinder assembly 14, can be secured to a suitable supporting structure as a vehicle firewall 32 by means of screws 34 (one of which is shown), carried by housing section 20, and cooperating nut 36.

A valve body 38 suitably secured to housing section 20 generally centrally thereof, as by means of annular flange 40, has a central bore 42 formed therein for slidably receiving a valve plunger member 44. A seal 46 received within an annular groove formed in plunger 44 and a second seal 48 retained within a counterbore, formed in valve body 38, by a radial flange 50 of plunger 44 serve to prevent leakage of fluid pressure between the valve body bore 42 and plunger 44.

One end of plunger 44 has a bore formed therein for closely receiving a relatively resilient retainer 52 which in turn receives the generally spherical end 54 of an actuating or brake pedal rod 56. An operator controlled brake pedal 58, suitably pivotally supported as at 60 to the vehicle firewall 32, is operatively connected as at 64 to the actuating rod 56. A cup-like retainer 66 tightly received by plunger 44 serves to retain the resilient member 52 in the position illustrated.

A relatively resilient poppet valve 68 comprised generally of a tubular body portion 70 and somewhat tubular valving portion 72 connected to each other by a relatively thin flexible portion 74, is retained within an annular groove 76 formed generally in an axial bore 78 of valve body 38. The annular groove 76 is defined at one axial end by a radially directed shoulder 80 and at the other axial end by a resilient annular snap ring 82 suitably retained within the bore 78. A cup-like member 84, having a centrally disposed aperture formed therethrough and a radially directed peripheral flange, maintains poppet valve body portion 70 radially outwardly into seated engagement with groove 76.

A relatively thin annular ring 86 received within the valving portion 72 of poppet valve 68 maintains said valving portion in proper configuration for engaging or seating against annular valving surfaces 88 and 90 of plunger 44 and valve body 38, respectively. A tubular member 92 provided with a radially directed flange 94 abuts against the radially inner portion 96 of ring 86 and, by virtue of compression spring 98 retained between flange 94 and snap ring 82, urges ring 86 and valving portion 72 towards engagement with valve seats 88 and 90.

A fibrous filter 100 filling the annular space between brake rod 56 and bore 78 is retained axially between the snap ring 82 and a suitable annular retainer cap 102 carried by the valve body 38. A coiled compression spring 104, suitably seated as against the valve body retainer ring 106, urges the brake rod 56, brake pedal 58, plunger 44 and valving portion 72 of poppet valve 68 to the respective positions shown, by means of an annular spring retainer 108, during periods in which the power brake unit 10 is inactive or at rest.

Valve body 38 is also provided with an axially directed annular recess 110 which communicates with a plurality of axially directed passages 112 (one of which is shown) extending at one end therefrom. An enlargement of one end of bore 42 forms an annulus 114, defined generally by the plunger 44 and valve body 38, which communicates with a plurality of radially directed passages 116, which also are in communication with chamber 27.

A power piston 118 generally comprised of diaphragm 26 and a piston member 120, is carried by valve body 38 in a manner permitting of relative axial movement therebetween. That is, an annular bearing 122 closely received about the outer diameter 124 of valve body 38 and closely received within a counterbore 126 of piston member 120 enables the power piston 118 to slide axially along diameter 124 whenever a sufficient pressure differential is created across the power piston. Leakage of fluid pressure between valve body 38 and piston member 120 is effectively prevented by a suitable annular seal 128 retained between the bearing 122 and a retainer ring 130 suitably secured to and carried by the piston member 120.

An axially directed centrally disposed cylindrical extension 132 of piston member 120 has a portion 134 of reduced diameter which is externally threaded so as to receive an internally threaded tubular adjusting nut 136 having a conical abutment surface 138 formed at one end thereof. A suitable threaded locking member 140 may be provided so as to minimize any possible tendency of adjusting nut 136 to rotate relative to threaded portion 134 once the desired relationship therebetween is achieved. The thread lock 140 may, of course, be of any suitable type as, for example, an unthreaded plastic insert which creates a slight thread interference.

A master cylinder outer piston 142 slidably received within the master cylinder or bore 144 of the assembly 14 is provided with annular pressure seals 146, 148 and 150 of which seals 146 and 148 are intended to perform a sealing function as between the outer piston 142 and bore 144. A cylindrical inner reaction piston 151 slidably received within a generally concentric bore 152 formed in outer piston 142 is urged axially to the right thereof by a compression spring 154 carried by a retainer 156. A second compression spring 158 contained within bore 144 and seated at one end against a check valve assembly 160 continually urges spring retainer 156 against forward end 162 of outer piston 42. A cup seal 164, disposed between spring 154 and inner reaction piston 151, along with seal 150 serves to effectively restrict any leakage as between inner reaction piston 151 and bore 152.

An abutment member 153 having a generally spherical surface 155 formed thereon abutting against the conical surface 138 of adjusting nut 136, is partly received within one end of and carried by the outer piston 142.

A reservoir 166 is provided with a fill port or passage 168 in the bottom wall thereof for filling the cylinder bore 144 when the outer and inner pistons 142 and 151 are in their respective retracted positions as illustrated in FIGURE 1. An additional port 170 is provided in the lower wall of reservoir 166 for communication with the annular chamber 172 between opposite ends of outer piston 142 to prevent cavitation in the cylinder bore 144 during a fast return stroke of the outer piston.

Inner piston 151 is urged into abutting engagement with the forward end of a reaction push rod 174 which is generally loosely received within the inner piston. An annular seal 176, retained within threaded projection 134 generally by a backing plate 178 and snap ring 180, provides a degree of radial support for the other end of push rod 178 which is contained generally within a recess 182 formed in and extending axially of plunger 44.

Intermediate its ends, push rod 174 is preferably provided with an enlarged pilot diameter which carries an annular reaction spring 184. In the embodiment shown, spring 184 is comprised of two generally concentric resilient spring portions 186 and 188 which are connected to each other by a radially directed relatively thin bridge portion 190. A radiating annular flange 192 secured to or formed integrally with push rod 174 is caused to at times abut against the piston member 120 or against spring 184 as will become evident from the description to follow.

A bellows type seal 193 is secured at one end to extension 132 of piston member 120 as by means of an annular retainer 194 having a bent tab 196 directed radially inwardly through a radial passage 198. A plurality of such tabs and passages 198 may, of course, be provided. The other end of bellows seal 193 is urged radially outwardly by a member 200 against a centrally disposed flange 202 of housing section 18 so as to be axially retained therebetween by radially directed lip portions 204 and 206. A relatively porous gasket 208 retained between housing section 18 and master cylinder assembly 14 enables chamber 210, defined generally by bellows seal 193, to be at substantially ambient atmospheric pressure.

Check valve 160 controls brake fluid flow to and from the outlet passage 212 which in turn is connected by a conduit 214 with the wheel cylinders 216 of brakes 218 of the motor vehicle.

Conduit 220 has one end in communication with a source of vacuum, such as the intake manifold 222 of the vehicle engine 224, and its other end communicating with a chamber 226 of a check valve assembly 228. The check valve assembly may be comprised of a body 230, suitably secured to housing section 18, provided with a conduit portion 232 in open communication with chamber 25. A plurality of passages 234, formed through a wall 236 common to conduit portion 232 and chamber 226, permits the free flow of fluid from chamber 25 to the engine intake manifold but inhibits flow of fluid in the reverse direction. Such directional control of fluid flow is achieved as by means of a relatively flexible valve member 238 contained generally within chamber 226 and mounted on a stem 240 secured within wall 236.

OPERATION

The various elements will assume substantially the positions shown in FIGURE 1 whenever the power brake unit 10 is at rest or inactive. During such periods spring 104 will maintain brake rod 56 and valve plunger 44 to the right limited generally by the abutment of flange 50 against valve body 38. Spring 98 will urge valve portion 72 of poppet valve 68 into sealing engagement with the valve seat surface 88 formed on plunger 44 thereby preventing the flow of ambient air therebetween which is admitted centrally of poppet valve 68 by filter 100.

At this time, with the engine 224 operating at, for example, idle conditions, engine intake manifold vacuum is directed through conduit 220, passages 234, chamber 25, through passage 198 into the space between piston member extension 132 and valve body 38 and into annular recess 110. Manifold vacuum is further transmitted from recess 110 through axially extending passages 112 between poppet valve valving portion 72 and seating surface 90 and into the annulus 114 from where it is directed through radial passage 116 into chamber 27. Because of manifold vacuum being directed to both sides of power piston 118, except for the portion exposed to ambient air pressure in chamber 210 (defined by bellows seal 193) the power piston 18 is maintained in its rearward most position as illustrated in FIGURE 1. Spring 158, of course, maintains outer piston 142 and end member 153 in abutting engagement with surface 138 of adjusting nut 136.

When the brake pedal 58 is depressed, that is pivoted clockwise about pivot 60, brake pedal rod 56 moves valve plunger 44 forwardly to the left thereby allowing spring 98 to move valve portion 72 into sealing engagement with seating surface 90 of valve body 38.

The slightest further movement of brake pedal 58, in the same direction, causes seating surface 88 of plunger 44 to move to the left and away from valving portion 72. Consequently, the further communication of manifold vacuum from passages 112 to annulus 114 is terminated because of the sealing engagement between valving portion 72 and seating surface 90, while communication between annulus 114 and the ambient atmosphere is completed because of the opening created between valving portion 72 and plunger surface 88.

Atmospheric pressure thusly admitted to annulus 114 is transmitted through radial passage 116 and into chamber 27 causing an actuating fluid pressure differential to exist across the power piston 118. The brake pedal 58 need not be further depressed since at this stage of operation the power brake unit 10 operates as a full power brake unit. That is, the said pressure differential causes power piston 118 to move forwardly to the left carrying with it the adjusting nut 136, end abutment member 153 and outer master cylinder piston 142. The inner reaction piston 151 will not move with piston 142 from the position illustrated in FIGURE 1 and any tendency of inner piston 151 to so move, as may be experienced during initial movement of outer piston 142, is effectively overcome by compression spring 154.

As outer master cylinder piston 142 moves forwardly to the left, hydraulic brake fluid contained within master cylinder 144 is displaced causing the hydraulically connected wheel brake cylinders 216 to move the vehicle wheel brakes 218 towards vehicle braking position. As outer piston 142 continues its travel to the left, the pressure of the hydraulic brake fluid increases, first to overcome, generally, the force required to move the vehicle brakes against the restraining force of the return springs 242 (initial brake setting force) and secondly to actually apply the vehicle braking forces.

The increase in hydraulic brake fluid pressure also exhibits itself against cup seal 164 and inner piston 151 as a reaction force which is transmitted to the vehicle operator in the manner to be described.

The initial vehicle brake setting force reacts against inner piston 151, moving it slightly rearwardly, and is transmitted through the reaction push rod 174 into flange 192. As the force increases, flange 192 compresses the outer annular spring 186 against that portion of valve body 38 in juxtaposition therewith. The compression of outer annular spring 186 continues until the total initial vehicle brake setting force is realized at which time the inner annular spring 188 will be moved axially by flange 192 so that it will be just engaging both the flange 192 and the flange end of valve plunger 44. From the above, it should be apparent that since the initial vehicle brake setting forces are transmitted into the power brake unit housing by means of valve body 38, the vehicle operator need not physically overcome such forces.

Further movement of the outer piston 142, or any increase in hydraulic brake fluid pressure created thereby, of course, causes inner piston 151 to experience an increase in reaction force thereagainst which is also transmitted through reaction push rod 174 and flange 192. As the inner piston experiences such increases in reaction force, the inner annular spring 188 undergoes compression between flange 192 and flange-end of valve plunger 44. During this period, both annular springs 188 and 186 are undering compression; however, the force transmitted through outer spring 186 is still being acted against by the power brake unit housing and not the vehicle operator.

Accordingly, it can be seen that during that period of operation wherein both inner and outer annular springs 188 and 186 are being compressed, the vehicle operator senses a reaction force through plunger 44, brake rod 56 and pedal 58 which is related to the actual applied vehicular braking force. However, the reaction force so sensed by the operator during this period is developed by only a portion of the reaction force applied to inner piston 151 since part of that force is still transmitted through the outer annular spring 186 into valve body 38.

As the pressure of the hydraulic brake fluid increases, through the continued action of outer piston 142 and power piston 118, the inner and outer annular springs 188 and 186 are compressed to the degree causing end 244 of push rod 174 to abut against the end of recess 182 and thereby transmit such increased reactive forces sensed by inner piston 151 directly into valve plunger 44, brake rod 56 and pedal 58.

All of the above described reaction forces can, of course, be sensed by the vehicle operator without at all moving the pedal 58 any perceptible amount. That is, since the power brake unit 10 does function as a full power brake unit the amount of movement required by the brake pedal is very slight and need only be that amount sufficient to perform the pneumatic regulation required by seating surfaces 88, 90 and valving portion 72.

In one particularly successful embodiment of the invention valve plunger 44 had a total movement in the order of 3/64 inch from the at rest condition of the power brake unit to maximum applied braking power while the brake pedal had a total movement in the order of 1/8 inch.

In view of the above, it can be seen that while during normal operation the power brake unit 10 functions as a full power brake unit but has the further important advantage of creating a signal, continually indicative of the applied vehicle braking force, which is directed to the vehicle operator through the brake pedal even though the brake pedal experiences a very limited amount of required total travel.

The invention as herein disclosed provides another important advance over the prior art, that is, the ability of the vehicle operator to physically contribute an additional braking force to the vehicular braking system regardless of the braking force supplied by the power piston 118 and outer master cylinder piston 142. In order to better illustrate this and other important improvements of the invention reference hereinafter will also be made to FIGURES 2, 3, 4 and 5 which schematically illustrate the power brake unit 10 of FIGURE 1 in various operating conditions. Where convenient and obviously suitable, schematically illustrated elements of FIGURES 2-5 which are functionally equivalent to those of FIGURE 1 are identified with like reference members.

FIGURE 2 illustrates the power brake unit 10 at rest; that is, the combination abutment and valve member 246, carried by the combined inner piston, reaction push rod and brake pedal rod 248, is seated generally on its surface 250 so as to prevent the communication, through passage 252, of chamber 27 with the ambient atmosphere.

FIGURE 3 schematically illustrates the power brake unit 10 during normal braking application. During this time brake pedal 58 has been actuated so as to cause surface 250 of valve 246 to be moved a slight amount to the left enabling chamber 27 to be exposed to the relatively high ambient atmospheric pressure. Power piston 118 causes outer master cylinder piston 142 to move forwardly to the left displacing hydraulic brake fluid out of master cylinder bore 144 into conduit 214. Each time that the brakes are normally applied the power piston 118 will move to a position generally as schematically illustrated by FIGURE 3.

It is conceivable that after extended periods of use repair of the vehicular brake system may be required because of, for example, either loss of hydraulic brake fluid or wear of the brake shoe linings. If such is the case, the power piston 118 and outer master cylinder piston 142 will have to travel further forwardly to the left in order to compensate for such needed brake shoe adjustment or loss of hydraulic brake fluid. The travel of the power piston and outer master cylinder piston will continue to increase until such time as when further increased travel is prevented as by the power piston 118 abutting against the housing 12 of the power brake unit 10 as illustrated in FIGURE 4. As previously stated, in the power brake units of the prior art, once the power piston is similarly prevented from further travel the vehicle operator has virtually no way in which he can physically exert any additional braking forces if the force created by the power piston at that time is insufficient.

According to the invention, however, after the power piston has in fact reached its maximum point of travel, the vehicle operator is still presented with a means whereby he can physically contribute additional braking forces. For example, with reference to FIGURE 4, if power piston travel has been stopped by housing 12 and if sufficient vehicle braking forces have not been developed by the outer master cylinder piston 142 and power piston 118, the vehicle operator may further depress pedal 58 so as to urge inner piston assembly 248 forwardly to the left in order to displace an additional amount of hydraulic brake fluid and thereby sufficiently increase the vehicle braking forces. In FIGURE 4, such movement of inner piston assembly 248 and valve 246 is illustrated in phantom lines.

It is apparent the vehicle operator will be continually warned of some requirement to either repair or adjust the vehicle braking system by the continually increasing need to physically apply such additional increasing increments of vehicle braking forces. In other words, in the normal course of use the vehicle operator would initially be required to displace only a slight amount of hydraulic brake fluid to compensate for the then needed repair and as vehicle brake usage continued and the need for repair increased the operator would be required to increase the amount of brake fluid physically displaced thereby being made aware of even a slow deterrioration of the vehicle braking system.

As will be appreciated from the above, the invention provides means whereby the vehicle operator is not rendered helpless by suddenly finding that the power piston has traveled its maximum amount and that sufficient braking forces have not been developed as is the case with power brake units of the prior art.

In some situations the pressure differential across power piston 118 may become somewhat limited an insufficient to move the power piston and outer master cylinder piston sufficiently to the left so as to adequately decelerate the vehicle. This may occur, for example, because of some leakage in the vacuum conduit from the engine intake manifold. Because of the reduction in pressure differential across power piston 118, the power piston is incapable of moving outer master cylinder piston 142 sufficiently so as to create the necessary hydraulic braking forces. In such a situation the vehicle operator may just, as previously discussed with reference to FIGURE 4, further displace brake pedal 58 so as to move inner piston assembly 248 to the left so as to displace the required additional amount of hydraulic brake fluid. It should be apparent that if that amount of fluid displaced by the movement of inner piston assembly 248 is still insufficient to create the desired braking forces, then the operator may still further displace brake pedal 58 causing surface 254 of abutment member 246 to abut against surface 256 of power piston 118 so as to physically move the power piston, outer master cylinder 142 and inner piston 248 further to the left, as generally illustrated in FIGURE 5, until a sufficient amount of brake fluid has been displayed.

Further, in view of the above, it should be apparent that if for some reason no pressure differential is created across power piston 118, the vehicle operator can still physically apply a vehicle braking force even from the normally at rest condition shown in FIGURES 1 and 2 by merely depressing brake pedal 58 and thereby moving power piston 118, outer piston 142 and inner piston assembly 243 forwardly to the left so as to displace the hydraulic brake fluid and apply the vehicle brakes. Specifically with reference to FIGURE 1, such braking action is achieved by the operator depressing brake pedal 58 so as to move brake rod 56 and valve plunger 44 to the left against spring 184. As spring 184 undergoes compression, flange 192 is urged against piston member 120 thereby causing piston assembly 118 and master cylinder outer piston 142 to move to the left displacing the hydraulic brake fluid in bore 144. Simultaneously, reaction push rod 174 is urged against inner reaction piston 151 causing the inner piston to also displace the hydraulic brake fluid in bore 144.

Various modifications of the invention are, of course, possible. For example, referring to FIGURE 6 the valve plunger 44 and ball end 54 of brake rod 56 have been modified so as to receive an annular snap ring 258 within an annular groove formed in each of the cooperating members. Snap ring 258 performs the same functions generally as the resilient member 52 of FIGURE 1. That is, since spring 104, during at rest conditions, urges brake rod 56 to the right generally away from the housing 12 snap ring 258 provides a means of connection between the brake rod 56 and valve plunger 44 so as to cause the valve plunger 44 to move with brake rod 56 against the valving portion 72 of valve member 68. It should, of course, be apparent that many other means for connecting the brake rod to the valve plunger 44 could be employed without departing from the scope of the invention.

The invention as disclosed by FIGURE 1 contemplates the provision of a somewhat segmented outer piston assembly; that is, because of normal manufacturing tolerances it may be desirable to allow the various elements comprising the invention to experience some relative movement in order to accommodate possible variations in alignment among such elements. Accordingly the spherical surface 155 of member 153 and the conical surface 138 on adjusting nut 136 are provided so as to enable the outer piston to be slidably received within bore 144 and yet be in continuous operative contact with the power piston 118 regardless of any possible misalignment as between bore 144 and the elements contained by, for example, housing section 18.

In the modification illustrated by FIGURE 7 member 153 is provided with an axially directed tubular extension 260 which has an outer surface provided with a conical portion 262 and an annular recess 264. As nut 136 and member 153 are brought into engagement with each other, an O-ring 266 contained generally within annular groove 268 formed within nut 136 is partly received within the annular recess 264 thereby acting as a resilient connection between nut 136 and member 153. The O-ring 266 will overcome any tendency that nut 136 might have to axially pull away from member 153.

The invention may be practiced equally well with an arrangement wherein no relative angular motion is permitted as between the outer piston and power piston member. For example, FIGURE 8, wherein all elements which are like or similar to those of FIGURE 1 are identified with like reference numbers, illustrates an outer piston 270 having an end threadably received by the internally threaded extension 272 of power piston member 120. Attention should also be drawn to the modified bearing and sealing arrangement provided between the power piston member 120 and the outer surface of valve body 38. In order to accommodate some possible misalignment as between the master cylinder bore 144 and outer diameter 124 of valve body 38 an annular seal 274 is provided with an outer peripheral portion 276 retained to the power piston member 120 by a suitable annular retainer member 278. A sealing portion 280 in contact with outer diameter 124 is joined to the outer peripheral portion 276 by means of an intermediate annular web 282 An annular bearing member 284, of generally T-shaped cross section and partly received within the seal 274, is held against a radial shoulder portion 286 of piston member 120. The bearing and seal arrangement by virtue of not being closely confined radially of power piston member 120 accommodates any misalignment as between the outer diameter 120 of valve body 38 and bore 144.

In certain situations it may be desirable to further modify the invention so as to tailor the inherent sensitivity thereof without significantly altering or increasing the normal brake pedal travel. FIGURE 9 fragmentarily illustrates such a further modification. In essence the modification of FIGURE 9 presents means whereby the vehicle operator may depress the brake pedal some minute amount initially without causing an excessively rapid creation of an actuating pressure differential across power piston assembly 118 and the resulting rapid travel thereof. This is accomplished by providing some degree of resiliency as between the vehicle-operator-controlled brake pedal and valve plunger 44. The modification of FIGURE 9 accomplishes this by providing what may be considered to be a lost motion type of connection between the pivot 64 and brake rod 56. Such a lost motion connection may be comprised of a spring cup 288, retained on shaft 56 as by shoulder 290 formed thereon, and a second movable spring cup 292 which co-act to retain a compression spring 294 therebetween. A yoke 296 formed on spring cup 292 receives pivot 64 therethrough so as to complete the connection with brake pedal 58. Brake rod 56 may be provided with an annular clip 298 for preventing disengagement between spring cup 292 and brake rod 56.

As the vehicle operator depresses brake pedal 58 in the embodiment of FIGURE 9, the initial movement of the brake pedal is transmitted through the spring 294 instead of directly through rod 56. Spring 294 may be of a rating which will permit spring cup 292 to actually abut against spring cup 288, if such is desired.

The embodiment fragmentarily illustrated in FIGURE 10 is the functional equivalent of the modification of FIGURE 9. In the embodiment of FIGURE 10, however, the resiliency is created by interposing a resilient member, such as a rubber insert 300, between the forward end of brake rod 56 and valve plunger 44. The resiliency is, of course, obtained through the deformation of the rubber insert 300 by the abutting end 302 of brake rod 56. An annular snap ring 304 may be provided in order to keep valve plunger 44 and rod 56 connected to each other.

Additionally, as illustrated in FIGURE 1, the power brake housing section 20 may be formed so as to carry an electric switch assembly 306 which serves to open and close an associated electrical circuit 308.

The switch assembly may be comprised of a body 310, retained within an aperture formed in housing section 20, having a bore for the slidable reception therein of a cylindrical plunger member 312 which is continually urged axially forwardly to the left by a spring 314 seated in a tubular metal member 316 retained by body 310. The tubular member 316 has in contact therewith a fixed electrical terminal 318 also retained by body 310 while an extension 320 of plunger 312 carries a movable terminal 311. Extension 320 and plunger 312 may be of electrically non-conductive material or terminal 311 may be, in any suitable manner, insulated from extension 320. A flexible seal 322 retained generally between housing section 20 and switch body 310, serves to prevent leakage of ambient atmospheric pressure into chamber 27.

The electrical circuit 308, exclusively of switch assembly 306, is comprised of a source of electrical potential 324 and a vehicle warning brake lamp 330 (commonly referred to as a stop light) serially connected with electrical conductors 328 which, in turn, are connected to terminals 311 and 318.

Whenever the operator causes the power piston to move to the left, spring 314 correspondingly moves plunger 312, extension 320 and terminal 311. When terminal 311 contacts the end of tubular member 316 the electrical circuit 308 is closed causing the source of electrical potential 324 to energize the vehicle warning brake lamp 330. The stop light will, of course, remain energized until such time as when the power piston returns to its at rest position.

The invention has been described in conjunction with a vacuum source for the creation of a fluid pressure differential across the power piston assembly for actuation thereof. It should be apparent, however, that the invention can be practiced equally well wherein the said fluid pressure differential is dependent not on the existence of an area which is at subatmospheric pressure but rather created by the existence of a source which is at a superatmospheric pressure.

Further although only one preferred embodiment along with a selected number of modifications of the invention have been disclosed and described, it is apparent that other embodiments and modifications of the invention are possible within the scope of the appended claims.

I claim:

1. In a power brake unit having a fluid pressure differential responsive power piston, a master cylinder bore for the containment of a hydraulic brake fluid, a master cylinder piston received by said bore, a reaction piston received by said master cylinder piston valve means openable for creating said pressude differential across said power piston for actuation thereof, and manual means for at times opening said valve means for the creation of said pressure differential, means for connecting said master cylinder piston to said power piston, said connecting means comprising an adjustable member secured to said power piston for movement therewith, a first abutment surface formed on said adjustable member near one end thereof, an abutment member carried by said master cylinder piston at one end thereof, a second abutment surface formed on said abutment member abuttably engaging said first abutment surface, said first abutment surface comprising a conical seat-like portion and said second abutment surface comprising a spherical portion received by said conical seat-like portion for universal pivotal rotation therein, an annular groove formed generally internally of said adjustable member, an axially directed tubular extension formed on said abutment member so as to be generally loosely received within said adjustable member, an annular groove formed in said extension externally thereof, said external groove being axially positioned so that said external groove is slightly out of juxtaposition with said internal groove when said respective abutment surfaces are in engagement with each other, and an annular resilient member partly received within each of said grooves so as to be generally interposed between said adjustable member and said extension for resiliently connecting said adjustable member and said extension to each other and to continually urge said respective abutment surfaces into engagement with each other.

2. A power brake unit comprising a housing formed of forward and rearward housing sections, a radially extending annular diaphragm retained at its outer periphery between said housing sections, a power piston member engaged by said diaphragm, a generally centrally disposed cylindrical extension formed on said power piston member and directed forwardly thereof, a generally cylindrical valve body retained by said rearward housing section and having its rearward end in communication with the ambient atmosphere, a valve member received within said valve body, a valve plunger slidably received within said valve body, bearing means retained by said power piston member and engaging the outer diameter of said cylindrical valve body for enabling said power piston member to slide along said outer diameter, gas-permeable filter means received within said valve body between said valve member and the rearwardmost end of said valve body forming an avenue of communication with said ambient atmosphere, a pivotally supported operator-controlled brake pedal, an actuating rod slidably received through said filter means and having its forwardmost end connected to said valve plunger and its rearwardmost end operatively connected to said brake pedal, resilient means forming a lost-motion connection between said brake pedal and said actuating rod, a first coiled compression spring received about said actuating rod and between said valve member and said filter means for continually urging said valve member forwardly, a second coiled compression spring received about said actuating rod externally of said valve body for continually urging said brake pedal, actuating rod and valve plunger rearwardly, first conduit means communicating between a source of relatively low pressure fluid and said housing at a point between said forward housing section and said diaphragm, a master cylinder assembly having a bore formed therein secured to said forward housing section in a manner causing said bore to be generally in axial alignment with the outer diameter of said valve body, a gas and fluid permeable gasket interposed between at least portions of said forward housing section and said master cylinder assembly, a generally tubular seal connected at one end with said cylindrical extension and at the other end with said forward housing section so as to define a chamber within said housing which is in continual communication with said ambient atmosphere through said permeable gasket, second conduit means formed in said valve body, third conduit means formed through said extension for directing said low pressure fluid to said second conduit means, said valve member and valve plunger being effective when abutting against each other to permit the communication of said low pressure fluid through said second conduit means to said housing at a point between said diaphragm and said rearward housing section, said actuating rod being effective upon movement of said brake pedal to move said valve plunger forwardly and away from said valve member so as to terminate the communication of said low fluid pressure to said housing between said diaphragm and said rearward housing section and to permit the communication of relatively high ambient atmospheric pressure thereto in order to create a pressure differential across said diaphragm and said power piston member thereby moving said power piston member forwardly along said outer diameter of said valve body, a hydraulic brake fluid reservoir formed in said master cylinder assembly, fourth conduit means communicating between said reservoir and said bore for conveying said hydraulic fluid from said reservoir to said bore, a master cylinder piston slidably received within said bore for at times forcibly displacing at least a portion of said hydraulic brake fluid out of said bore and into an associated hydraulic brake circuit, a reaction piston slidably received within said master cylinder piston and having its forward end exposed to action thereagainst by said hydraulic brake fluid within said bore, an adjustment member threadably secured to said cylindrical extension, a first abutment surface formed on said adjustment member near one end thereof, a second abutment surface formed at the rearward end of said master cylinder piston for abutably engaging said first abutment surface in order to create a universally pivotal connection therewith, a reaction force transmitting rod having its forward end in abutting engagement with said reaction piston, a radially directed flange carried by said reaction rod, said flange being located axially of said rod so as to have the radially extending forward-most surface thereof at times in abutting engagement with a portion of said cylindrical extension, spring means located generally about said reaction rod and positioned axially thereof so as to be generally between rearward-most radially extending surface of said flange and the forward-most end of said valve body, a recess formed in the forward-most end of said valve plunger for receiving the rearward-most end of said reaction rod, a third coiled compression spring contained within said bore urging a spring retainer against the forward-most end of said master cylinder piston, and a fourth coiled compression spring held by said spring retainer and urging said reaction piston generally rearwardly of said master cylinder piston.

3. A power brake unit comprising a housing formed of forward and rearward housing sections, a power piston member contained within said housing and adapted for axial movement therein, a generally centrally disposed cylindrical extension formed on said power piston and directed forwardly thereof, a generally cylindrical valve body retained by said rearward housing section and having its rearward end in communication with the ambient atmosphere, said valve body having at least a portion thereof formed to define an outer cylindrical surface, a valve member received within said valve body, a valve plunger slidably received within said valve body, bearing means retained by said power piston and engaging said outer cylindrical surface of said cylindrical valve body for enabling said power piston to slide therealong, a manually positionable brake pedal, an actuating rod operatively connecting said valve plunger to said brake pedal, a first compression spring received about said actuating rod and operatively engaging said valve member for continually urging said valve member forwardly, first conduit means communicating between a source of relatively low pressure fluid and said housing at a point between said forward housing section and said power piston, a master cylinder assembly having a bore formed therein carried by said forward housing section in a manner causing said bore to be generally in axial alignment with the outer diameter of said valve body, a generally tubular seal connected at one end with said cylindrical extension of said power piston and at the other end with said forward housing section so as to define a chamber within said housing which is in continual communication with said ambient atmosphere, second conduit means formed in said valve body, third conduit means formed through said extension for directing said low pressure fluid to said second conduit means, said valve member and valve plunger being effective when abutting against each other to permit the communication of said low pressure fluid through said second conduit means to said housing at a point between said power piston and said rearward housing section, said actuating rod being effective upon movement of said brake pedal to move said valve plunger forwardly and away from said valve member so as to terminate the communication of said low fluid pressure to said housing between aid power piston and said rearward housing section and to permit the communication of said ambient atmospheric pressure thereto in order to create a pressure differential across said power piston thereby moving said power piston forwardly along said outer cylindrical surface of said valve body, a master cylinder piston slidably received within said master cylinder bore for at times forcibly displacing a portion of said hydraulic brake fluid out of said master cylinder bore and into an associated hydraulic brake circuit, a reaction piston slidably received within a second bore in said master cylinder piston and having its forward end exposed to action thereagainst by said hydraulic brake fluid within said master cylinder bore, a reaction force transmitting rod having its forward end in abutting engagement with said reaction piston, a radially directed flange portion carried by said reaction rod, said flange portion being located axially of said rod so as to have the radially extending forward-most surface thereof at times in abutting engagement with a portion of said cylindrical extension, spring means located generally about said reaction rod and positioned axially thereof so as to be generally between the rearward-most radially directed surface of said flange portion and the forward-most end of said valve body, a recess formed in the forward-most end of said valve plunger for receiving the rearward-most end of said reaction rod, a second compression spring contained within said master cylinder bore urging a spring retainer against the forward-most end of said master cylinder piston, and a third compression spring held by said spring retainer and urging said reaction piston generally rearwardly of said master cylinder piston.

4. A power brake unit comprising a housing formed of forward and rearward housing sections, a power piston member contained within said housing and adapted for axial movement therein, a generally centrally disposed cylindrical extension formed on said power piston and directed forwardly thereof, a valve body retained by said rearward housing section and having its rearward end in communication with the ambient atmosphere, said valve body having at least a portion thereof formed to define an outer cylindrical surface, a valve member received within said valve body, a valve plunger slidably received within said valve body, bearing means retained by said power piston and engaging said outer cylindrical surface of said valve body for enabling said power piston to slide therealong, a manually positionable brake pedal, an actuating rod operatively connecting said valve plunger to said brake pedal, a first spring operatively engaging said valve member for continually urging said valve member forwardly, first conduit means communicating between a source of relatively low pressure fluid and said housing at a point between said forward housing section and said power piston, a master cylinder assembly having a bore formed therein carried by said forward housing section in a manner causing said bore to be generally in axial alignment with the outer diameter of said valve body, a generally tubular seal connected at one end with said cylindrical extension of said power piston and at the other end with said forward housing section so as to define a chamber within said housing which is in continual communication with said ambient atmosphere, second conduit means formed in said valve body, third conduit means formed through said extension for directing said low pressure fluid to said second conduit means, said valve member and valve plunger being effective when abutting against each other to permit the communication of said low pressure fluid through said second conduit means to said housing at a point between said power piston and said rearward housing section, said actuating rod being effective upon movement of said brake pedal to move said valve plunger forwardly and away from said valve member so as to terminate the communication of said low fluid pressure to said housing between said power piston and said rearward housing section and to permit the communication of said ambient atmospheric pressure thereto in order to create a pressure differential across said power piston thereby moving said power piston forwardly along said outer cylindrical surface of said valve body, a master cylinder piston slidably received within said master cylinder bore for at times forcibly displacing a portion of said hydraulic brake fluid out of said master cylinder bore and into an associated hydraulic brake circuit, a reaction piston slidably received within a second bore in said master cylinder piston and having its forward end exposed to action thereagainst by said hydraulic brake fluid within said master cylinder bore, a reaction force transmitting rod having its forward end adapted for abutting engagement with said reaction piston, a radially directed flange portion carried by said reaction rod, said flange portion being located axially of said rod so as to have the radially extending forward-most surface thereof at times in abutting engagement with a portion of said cylindrical extension, spring means located generally about said reaction rod and positioned axially thereof so as to be generally between the rearward-most radially directed surface of said flange portion and the forward-most end of said valve body, a surface formed generally at the forward-most end of said valve plunger for at times abuttingly engaging the rearward-most end of said reaction rod, and resilient means for urging said reaction piston generally forwardly of said master cylinder piston whenever said master cylinder piston is caused to move forwardly to displace said hydraulic fluid.

5. A power brake unit having a housing with a fluid pressure differential responsive power piston, a master cylinder bore for the containment of a hydraulic brake fluid, a master cylinder piston received in said master cylinder bore, a reaction piston received in a second bore formed in said master cylinder piston and adapted to be acted upon by said hydraulic brake fluid, valve means openable for creating a fluid pressure differential across said power piston for actuation thereof in order to move said master cylinder piston axially within said master cylinder bore in order to displace at least a portion of said hydraulic fluid, manual means for at times opening said valve means in order to create said fluid pressure differential, means for connecting said master cylinder piston to said power piston, said connecting means comprising an adjustable member secured to said power piston for movement therewtih, said adjustable member having an axially extending end provided with a first contoured surface formed thereon, said master cylinder piston having an axially extending end opposed to said extending end of said adjustable member and provided with a second contoured surface adapted for abutting engagement with said first contoured surface, resilient means operatively engaging another end of said master cylinder piston for continually resiliently urging said master cylinder piston into said abutting engagement with said first contoured surface of said adjustable member, and force transmitting means adapted to engage at one end thereof said reaction piston and being effective to transmit a first portion of the reaction force developed by said hydraulic brake fluid as said brake fluid is displaced by said master cylinder piston and experienced by said reaction piston to said brake unit housing, said force transmitting means also being effective to transmit such forces experienced by said reaction piston which are in excess of said first portion of said reaction force to said valve means and manual means for urging said valve means and manual means in a valve closing direction.

6. A power brake unit having a housing with a fluid pressure differential responsive power piston, a master cylinder bore for the containment of a hydraulic brake fluid, a master cylinder piston received in said master cylinder bore, a reaction piston received in a second bore formed in said master cylinder piston and adapted to be acted upon by said hydraulic brake fluid, valve means openable for creating a fluid pressure differential across said power piston for actuation thereof in order to move said master cylinder piston axially within said master cylinder bore in order to displace at least a portion of said hydraulic fluid, manual means for at times opening said valve means in order to create said fluid pressure differential, means for connecting said master cylinder piston to said power piston in order to permit movement of said master cylinder piston by said power piston, said reaction piston being slidably received within said second bore and situated so as normally not to be moved by either said valve means or manual means or power piston when either of said valve means or manual means or power piston are actuated in order to cause displacement of said hydraulic brake fluid by said master cylinder piston, and force transmitting means operatively engaging said reaction piston for transmitting the hydraulic brake fluid reaction force developed during displacement of said hydraulic brake fluid by said master cylinder piston and applied to said reaction piston, said force transmitting means being effective to transmit first a portion of said hydraulic brake fluid reaction force to said housing and another portion of said hydraulic brake fluid reaction force to both said valve means and manual means for urging said valve means and manual means in a valve closing direction in order to terminate further displacement of said hydraulic brake fluid by said master cylinder piston.

7. A power brake unit having a housing with a fluid pressure differential responsive power piston, a master cylinder bore for the containment of a hydraulic brake fluid, a master cylinder piston received in said master cylinder bore for at times forcibly displacing said hydraulic brake fluid from said master cylinder bore and into an associated brake circuit, valve means openable for creating said pressure differential across said power piston for actuation thereof, manually movable means for at times opening said valve means in order to create said pressure differential, the movement of said manually movable means and the opening of said valve means being independent of the degree of displacement of said hydraulic brake fluid by said master cylinder piston, means for connecting said master cylinder piston to said power piston for movement therewith, a reaction piston slidably received in a second bore formed in said master cylinder piston and positioned so as to normally not be moved by said manually movable means, and force transmitting means engaging at one end thereof said reaction piston and being effective to transmit to said housing a portion of the reaction force developed by said hydraulic brake fluid during displacement thereof by said master cylinder piston and applied to said reaction piston, said force transmitting means also being effective to transmit reaction forces experienced by said reaction piston which are in excess of said portion of said reaction force to said valve means and manual means for urging said manual means through said valve means in a valve closing direction in order to terminate further displacement of said hydraulic brake fluid by said master cylinder piston.

8. A power brake unit having a housing with a fluid pressure differential responsive power piston, a master cylinder bore for the containment of a hydraulic brake fluid, a master cylinder piston received in said master cylinder bore, a reaction piston received in a second bore formed in said master cylinder piston and adapted to be acted upon by said hydraulic brake fluid, valve means openable for creating a fluid pressure differential across said power piston for actuation thereof in order to move said master cylinder piston axially within said master cylinder bore in order to displace at least a portion of said hydraulic fluid, manual means for at times opening said valve means in order to create said fluid pressure differential, means for connecting said master cylinder piston to said power piston in order to permit movement of said master cylinder piston by said power piston, said reaction piston being slidably received within said second bore and situated so as normally not to be moved by either said valve means or manual means or power piston when either of said valve means or manual means or power piston are actuated in order to cause displacement of said hydraulic brake fluid by said master cylinder piston, and force transmitting means operatively engaging said reaction piston for transmitting the hydraulic brake fluid reaction force developed during displacement of said hydraulic brake fluid by said master cylinder piston and applied to said reaction piston, said force transmitting means being effective to transmit first a portion of said hydraulic brake fluid reaction force to said housing and another portion of said hydraulic brake fluid reaction force to both said valve means and manual means for urging said valve means and manual means in a valve closing direction in order to terminate further displacement of said hydraulic brake fluid by said master cylinder piston, said force transmitting means also being effective to be at times moved by said valve means against said power piston in order to cause said power piston to move said master cylinder piston in a direction resulting in increased displacement of said hydraulic brake fluid.

9. A power brake unit having a housing with a fluid pressure differential responsive power piston, a master cylinder bore for the containment of a hydraulic brake fluid, a master cylinder piston received in said master cylinder bore, a reaction piston received in a second bore formed in said master cylinder piston, valve means openable for creating said fluid pressure differential across said power piston for actuation thereof, manually movable means for at times opening said valve means for the creation of said fluid pressure differential, said manual means functioning in the valve opening direction independently of the degree of displacement of said hydraulic brake fluid by said master cylinder piston, said power piston being effective upon opening of said valve means to cause axial movement of said master cylinder piston within said master cylinder bore while being ineffective for moving said reaction piston, said reaction piston being acted upon by the pressure of said hydraulic brake fluid during displacement of said brake fluid by said master cylinder piston and being effective to transmit through a force transmitting member the forces created thereagainst by said brake fluid to said manual means through said valve means, and said manual means being effective whenever an insufficient degree of said fluid pressure differential has been created to forcibly move said force transmitting member against said power piston in order to manually move said power piston, said reaction piston and said master cylinder piston in a direction causing displacement of said hydraulic brake fluid.

10. A power brake unit having a housing with a fluid pressure differential responsive power piston, a master cylinder bore for the containment of a hydraulic brake fluid, a master cylinder piston received in said master cylinder bore, a reaction piston received in a second bore formed in said master cylinder piston, valve means openable for creating said fluid pressure differential across said power piston for actuation thereof, manually movable means for at times opening said valve means for the creation of said fluid pressure differential, said manual means functioning in the valve opening direction independently of the degree of displacement of said hydraulic brake fluid by said master cylinder piston, said power piston being effective upon opening of said valve means to cause axial movement of said master cylinder piston within said master cylinder bore while being ineffective for moving said reaction piston, said reaction piston being acted upon by the pressure of said hydraulic brake fluid during displacement of said brake fluid by said master cylinder piston and being effective to transmit through a force transmitting member the forces created thereagainst by said brake fluid to said manual means through said valve means, said force transmitting member having a portion thereof contained generally between said power piston and said valve means so that forcible movement of said force transmitting member in one direction causes a force to be transmitted to said valve means while forcible movement of said force transmitting member in a direction opposite to said one direction causes a force to be transmitted to said power piston.

References Cited by the Examiner
UNITED STATES PATENTS

| | | | |
|---|---|---|---|
| 2,006,487 | 7/1935 | Sorensen | 60—54.6 |
| 2,642,165 | 6/1953 | Banker | 60—54.6 X |
| 2,763,989 | 9/1956 | Ayers | 60—54.6 |
| 2,767,548 | 10/1956 | Ayers | 60—54.6 |
| 2,811,835 | 11/1957 | Rike | 60—54.6 |
| 2,811,836 | 11/1957 | Ayers | 60—54.6 |
| 2,812,639 | 11/1957 | Whitten | 60—54.6 |
| 2,853,977 | 9/1958 | Sadler | 92—4 |
| 2,893,207 | 7/1959 | Hupp | 60—54.6 |
| 2,931,180 | 4/1960 | Randol | 60—54.6 |
| 2,946,195 | 7/1960 | Hare | 60—54.5 |
| 2,974,494 | 3/1961 | Rike | 60—54.6 |
| 2,976,686 | 3/1961 | Stelzer | 60—54.6 |
| 2,985,143 | 5/1961 | Stelzer | 60—54.6 X |
| 2,997,027 | 8/1961 | Ingres | 60—54.6 X |
| 3,015,213 | 1/1962 | Augustin | 60—54.6 |
| 3,050,944 | 8/1962 | Schwartz et al. | 60—54.6 |
| 3,199,298 | 8/1965 | Brown | 60—54.6 |

MARTIN P. SCHWADRON, *Primary Examiner.*

ROBERT R. BUNEVICH, *Examiner.*

UNITED STATES PATENT OFFICE
CERTIFICATE OF CORRECTION

Patent No. 3,293,849                                December 27, 1966

Robert H. Smith

It is hereby certified that error appears in the above numbered patent requiring correction and that the said Letters Patent should read as corrected below.

Column 6, line 70, for "undering" read -- undergoing --; column 7, line 53, for "members" read -- numbers --; column 8, line 41, for "deterrioration" read -- deterioration --; line 50, for "an" read -- and --; column 10, line 11, for "120" rea -- 124 --; column 11, line 35, for "piston" read -- piston, -- line 36, for "pressude" read -- pressure --; column 13, line 6 for "aid" read -- and --.

Signed and sealed this 7th day of November 1967.

(SEAL)
Attest:

Edward M. Fletcher, Jr.
Attesting Officer

EDWARD J. BRENNER
Commissioner of Patents